United States Patent [19]

Schenk et al.

[11] 3,860,485

[45] Jan. 14, 1975

[54] PREPARATION OF OLIGOMERS OF MICROENZYMES

[76] Inventors: Roy U. Schenk, 411 S. Brooks St., Apt. 2, Madison, Wis. 53715; Johan Bjorksten, 4601 Fish Hatchery Rd., Rt. 4, Madison, Wis. 53711

[22] Filed: Aug. 28, 1973

[21] Appl. No.: 392,298

Related U.S. Application Data

[63] Continuation of Ser. No. 240,692, April 3, 1972, abandoned, which is a continuation-in-part of Ser. No. 222,232, Jan. 31, 1972, abandoned.

[52] U.S. Cl. .................................. 195/66 R, 195/62
[51] Int. Cl. .............................................. C07g 7/02
[58] Field of Search ................. 195/62, 66; 240/692

[56] References Cited
UNITED STATES PATENTS
3,775,254  11/1973  Buetow ............................ 195/66 R

OTHER PUBLICATIONS

Bjorksten et al., Study of Low Molecular Weight Proteolytic Enzymes, Finska Kemists. Medd., 80, No. 4, 1971, (pp. 70–87).

Cowman et al., Temperature-Dependent Association-Dissociation of Streptococcus Lactis Intracellular Proteinase, Biochemical and Biophysical Research Comm., Vol. 23, No. 6, 1966, (pp. 799–803), QR501B43.

Isemura et al., The Association and Dissociation of the Bacterial Alpha-Amylase Molecule, The Journal of Biochemistry, Vol. 47, No. 4, 1960, (pp. 548–550), QP501J6.

Winzor et al., Studies of Chemically Reacting Systems on Sephadex, Biochemistry, Vol. 2, No. 6, 1963, (pp. 1263–1267), QP501B52.

*Primary Examiner*—David M. Naff
*Attorney, Agent, or Firm*—John M. Diehl; Johan Bjorksten

[57] ABSTRACT

Oligomers of microenzymes are prepared by a process involving the steps of passing an enzyme-containing solution through an ultrafilter to remove essentially all constituents having molecular weights higher than 10,000 to produce an ultrafiltrate containing a microenzyme, concentrating the ultrafiltrate, equilibrating to oligomerize the microenzyme and separating the oligomers by re-filtering through an ultrafilter which retains constituents having a molecular weight greater that 10,000. The oligomers have greater stability and in some cases higher activity than the microenzyme.

3 Claims, 1 Drawing Figure

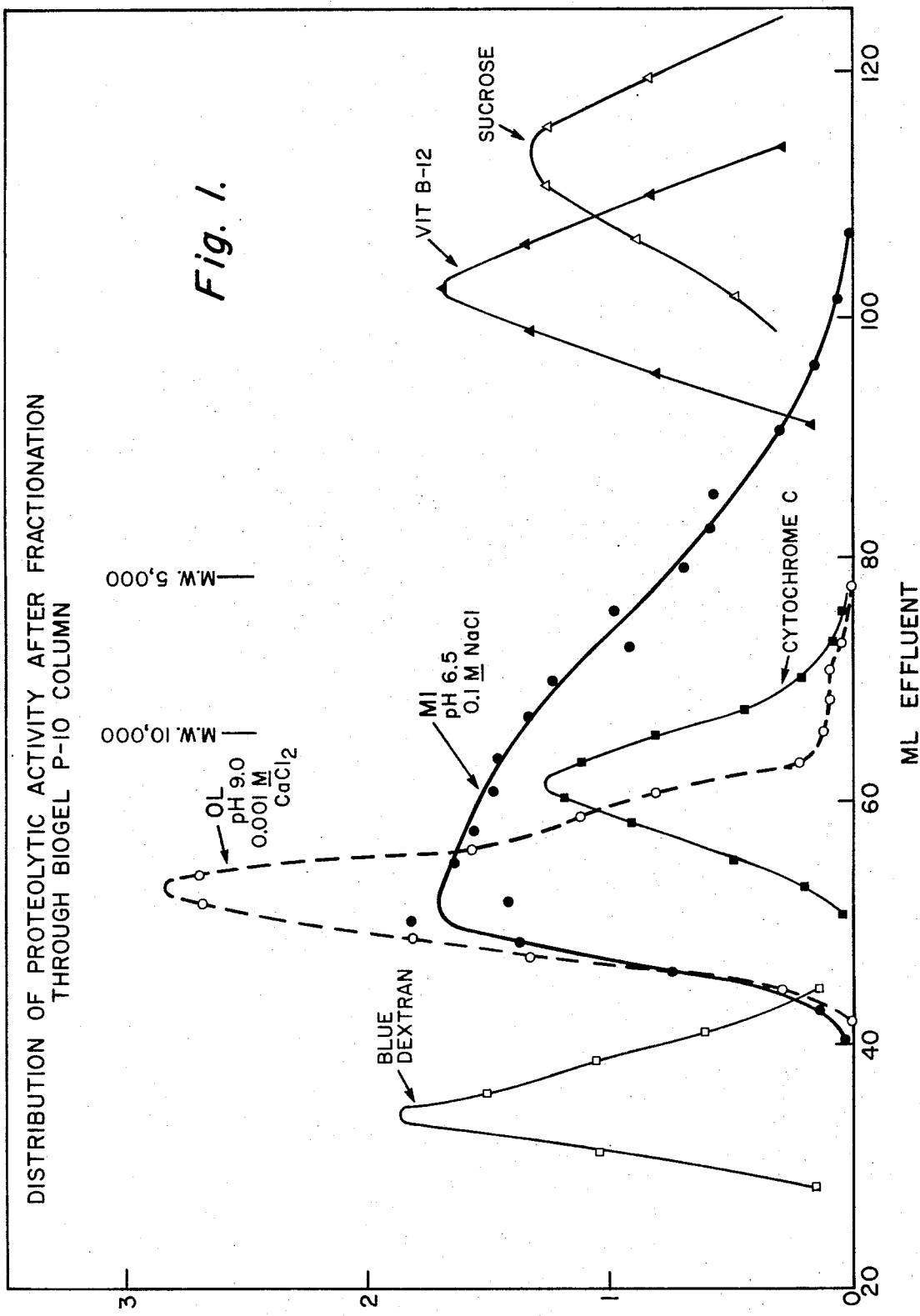

PREPARATION OF OLIGOMERS OF MICROENZYMES

This application is a continuation of Ser. No. 240,692, filed Apr. 3, 1972, now abandoned, which was a continuation-in-part of Ser. No. 222,232, filed Jan. 31, 1972, now abandoned.

BACKGROUND INFORMATION AND PRIOR ART

In the co-pending application Ser. No. 222,232 Filed: Jan. 31, 1972, we described the discovery of microenzyme systems comprising monomers having molecular weights below 10,000 and oligomers of these, these components being in equilibrium with each other, so that in a given dilution and at a given pH and temperature, a certain definite equilibrium or proportioning between monomer and oligomers takes place.

The microenzyme components of these systems can penetrate, and thus attack, highly crosslinked or otherwise sterically hindered modifications of their substrates, which are inaccessible to enzymes having larger molecular weights.

The oligomers, which as such cannot attack substrates accessible to the microenzymes, have the advantage of greater stability and at least in some cases, of higher activity than the microenzyme components.

OBJECTS OF THIS INVENTION

A principal object of this invention is a method for producing an enzyme composition having a molecular weight in excess of 10,000 and usually 12,000 to 36,000, which in aqueous solution will form an equilibrium with a microenzyme having a molecular weight between 1,000 and 10,000 and usually between 2,500 and 7,500.

Another object is a method for producing a substantially stable enzyme oligomer, which when dissolved in an aqueous medium slowly releases a minor percentage of a highly penetrant, usually less stable microenzyme.

Further objects will become apparent as the following detailed description proceeds.

DRAWINGS

The charts are representations in graphic form of enzyme activities as related to molecular weights. (One Figure)

BRIEF STATEMENT OF THE INVENTION

A broth in which the subject enzyme system has been formed by microorganisms is centrifugated to remove cells or cell debris, and any abrasive or other solid material that may have been used in processing and ultrafiltered through a membrane impermeable to molecules larger than mol. wt. 10,000. It is then allowed to stand for oligomerization of microenzyme present, and when an equilibrium appears near at hand the entire solution is again passed through the same ultrafilter.

Since the first ultrafiltration removed all substances having a molecular weight above 10,000, it is apparent that any enzyme remaining above the filter after the second ultrafiltration must have been formed by oligomerization of microenzyme. Resolubilization of the materials above the membrane in concentrated form which may be followed by prompt drying further converts, by mass action, the major part of any remaining microenzyme to the oligomers, so that the resultant product will be essentially free from microenzyme. The microenzyme remaining as impurity in any resultant dry enzyme oligomer composition will be less than 5 percent and usually substantially less than 3 percent of the total enzyme content and/or enzyme activity.

DETAILED DESCRIPTION

Example 1

We prepared an enzyme containing broth by growing a strain of *Bacillus cereus* in 10 L of a broth containing 150 g of bacteriological peptone, 120 g of yeast extract and 370 g of glucose. This was charged into a 14,000 ml New Brunswick fermentor and grown under the following conditions:

| | |
|---|---|
| Initial pH: | 7.4 |
| Agitation: | 350 RPM using a two blade turgin agitator |
| Temperature: | 34° C |
| Aeration: | 2 liters of air per minute | pH was monitored during the fermentation and adjusted by routine means as necessary to maintain it within pH limits of ±0.5.

The yield was harvested after 74 hours by removing the cells in a Sharples super centrifuge. The resultant cell free broth was cooled to 4°C. The proteolytic activity of the final solution as determined by the Congocoll assay method of Nelson et al. was 1,070 units per ml.

Of this, 6.0 Units/ml passed through an Amicon UM-10 ultrafilter membrane under 30 lbs. nitrogen pressure. The membranes were routinely checked with a solution of Cytochrome C (MW 12,400) to assure their integrity.

The bulk of the resultant enzyme solution was frozen in 1 liter containers, for future use. In this frozen state no deterioration of enzyme activity was observed even over a period of a year.

Example 2

One liter of the frozen solution was later thawed and passed through an Amicon UM-10 ultrafilter membrane under 25 – 40 psi nitrogen pressure. The ultrafiltrate was concentrated by ultrafiltration over a second membrane, Amicon UM-2, which retains materials with molecular weight greater than 1,000. These membranes are sold by Amicon Corporation, Lexington, Mass. Essentially all of the enzyme moieties remained above this membrane, while low molecular contaminants and water were removed. The enzyme solution thus remaining above the UM-2 membrane was washed on the membrane three times with 250 ml of 0.02 NaCl solution and was finally removed and diluted to a total volume of 250 ml. This solution contained 1,500 Congocoll units per ml, corresponding to 375 units per ml of the original volume. This is 35 percent of the total proteolytic activity of the original solution, and represents a near optimal yield under the conditions stated, though still further improvements appear possible.

Example 3

To determine the effect of dilution on the molecular weight distribution of the enzyme complex, and on the final equilibrium between its components, we later diluted a portion of the ultrafiltrate concentrate just referred to in ratios 1:10 and 1:1000 with 0.02 M *n*-ethyl morpholine solution containing 0.1 M NaCl and 0.001 M $CaCl_2$ (NEMO) or with 0.02 M NaCl solution (NaCl) and allowed these to stand 24 hours at 4°C to equilibrate. Following this they were passed through the UM-10 ultrafilter membrane. The results are shown in Table 1.

Proteolytic Activity-Congocoll Units/ml of original solution

| dilution | NaCl | NEMO |
|---|---|---|
| 1:10 | 2.7 | 1.3 |
| 1:000 | 111 | 21 |

Since the activity of the original solution after ultrafiltration was 1,500 it is apparent that in 1:10 dilution the equilibrium between activity as microenzyme and oligomers is such that the microenzyme is about 0.1 to 0.2 percent of the total activity; while in a 1:1000 dilution the microenzyme formation is favored, and is in round figures between 1 and 8 percent of the total activity before equilibration.

Thus, we have found that on concentrating the microenzyme solution, and allowing it time for equilibration, it will be converted to oligomers, so that at least 90 percent and usually 98 – 99.95 percent of the enzyme activity originally passing through an ultrafilter with cut off at 10,000 Mol. Wt., will no longer pass through said ultrafilter. Upon dilution the oligomers will reform a certain minor proportion of microenzyme. By microenzyme, we mean an enzyme having a molecular weight less than 10,000.

Example 4

To prepare a solid preparation principally consisting of oligomers having molecular weight higher than 10,000, which on dissolution and dilution, with water equilibrate to reform 0.1 to 15 percent of microenzyme, we thawed a liter of frozen ultrafiltered protease prepared in accordance with Example 1, and concentrated it to dryness by slow evaporation at 1°C, in vacuum. Allowing 5 hours for the evaporation to dryness, the shift toward oligomers proceeded concurrently with the evaporation, so that at the final drying stage, the content of microenzyme was approximately 0.2 percent of the activity of the last milliliter of liquid remaining, or in the order of 0.0002 percent of the original total activity. On dissolution in water, this again equilibrates to about 0.2 – 10 percent of microenzyme, dependent on dilution, pH and ions present.

While we have referred to a particular organism, in the examples, we have found that every spore forming organism we have encountered which forms spores resistant to boiling will generate microenzymes and oligomers thereof as described above. While we do not wish to commit ourselves to any theory regarding the reasons for this, it is our belief that all such spores contain very highly crosslinked, very dense structures, which present a virtually complete steric hindrance for the penetration into such structures of substances having molecular weights above the range of about 7,000 to 10,000. To generate such spore walls, and particularly to redissolve them in gemination, the spore forming organisms must have at their disposal microenzymes capable of penetrating such dense net or cage structures.

It appears that microenzyme forming organisms can be isolated from any substrate rich in spore forming microorganisms, such as garden soil, laboratory air, telephone receivers, decaying wood or animal protien, or the like, by making an infusion, boiling it a couple of minutes, and plating out on nutrient agar. Every one of well over 100 such cultures which we have investigated has proven positive for microenzymes.

While reference has been made to proteolytic enzymes, it appears highly probable that analogous enzymes exist in other classes, including for example cellulases, lipases, lignases, oxidases polymerases, and the like.

While in the examples we have used organisms which excrete substantial quantities of the enzyme complex of this invention, it is possible also to utilize the enzyme content of the cellular mass. To this end the cells are killed in any one of the several manners familiar to the art, such as autolysis with toluene or other cell poisons to render the cell membranes permeable to enzyme, by alternatingly freezing and thawing the cell mass, by disintegrating it mechanically or by ultra sound or other disruptive vibrations, by grinding with or without abrasives, and the like. This procedure gives a higher yield of enzymes, but it also leads to a greater difficulty in preparing pure preparations, because of the larger number of non-enzyme impurities thus released.

We may employ, for example, acetone as a means for precipitating impurities from the solution. Without losing excessive enzyme content, we may use other substances similarly active for removal of such impurities. For example, instead of acetone we may use water miscible alcohols, glycols, amides such as dimethyl formamide or substituted acetamide, glycol esters or ethers, dimethyl sulfoxide, and generally organic or inorganic substances which reduce the capacity of water for dissolving large molecular organic substances of the protein-peptide class. These also include inorganic salts having a water solubility in excess of about 10 percent. Notably, ammonium sulfate has been used in the art to separate enzymes in solution from contaminants, and it is here also applicable.

In preparing the oligomers, the operation of concentrating the product by evaporation should be carried out so as to avoid a rise of temperature of the material being evaporated to temperatures higher than about 60°C.

For equilibration, whereby we mean causing the oligomers and the microenzyme to mutually interconvert so as to form a composition in which the speed of conversion from oligomers to microenzyme equals the speed of the conversion from microenzyme to oligomers we maintain the composition containing said components at a pH between 5 and 10 and preferably between pH 5 5 and 9 at a temperature below about 60°C for a time sufficient to cause a stable balance between the microenzyme and the oligomeric enzyme to take place. Usually 2–5 hours are preferred though a practically sufficient equilibration is often reached in about one-half hours.

To minimize losses in this process, and to maximize stability and/or facilitate the equilibration we prefer to have present at least $1 \times 10^{-5}$ of a metal ion. We prefer to use metals of groups 1 and 2 of the periodic system, particularly the alkali and earth alkali metals. Obviously, we avoid using metals known to be incompatible with the particular enzymes used in each case. For example, many enzymes are inactivated by mercurous or mercuric ions, several by copper, and some by cadmium.

In addition to the steps described above, we may use salting out or solvent precipitation steps as well as preparative electrophoresis, to remove impurities from the enzyme compositions of our invention. The microenzymes and the oligomers will tolerate, for example acetone or ammonium sulphate, the precipitants most commonly used for preparative purposes in enzyme chemistry.

Having thus disclosed our invention, we claim:

1. A method for producing oligomers of proteolytic microenzymes, which comprises growing a spore forming organism in a culture medium, removing solid matter from said medium, forcing said medium through an ultrafilter membrane retaining molecules larger than about 10,000 Mol. Weight to provide an ultrafiltrate containing a proteolytic microenzyme concentrating said ultrafiltrate an amount so that at least 90 percent oligomers result by equilibration, equilibrating said concentrated ultrafiltrate to oligomerize said microenzyme to produce at least 90 percent oligomers and separating said oligomers from the ultrafiltrate by forcing said concentrated ultrafiltrate through an ultrafilter membrane which retains molecules larger than about 10,000 mol. weight.

2. The method of claim 1 in which said equilibration is carried out in the presence of a solution containing at least $1 \times 10^{-5}$ moles/liter of a metal ion.

3. The method of claim 2, said metal ion being selected from the metals of groups 1 and 2 of the periodic system, at pH between 5 and 10 and a temperature between 0° and 60°C.

* * * * *